US012330411B2

(12) United States Patent
Hamada

(10) Patent No.: US 12,330,411 B2
(45) Date of Patent: Jun. 17, 2025

(54) PRINTING APPARATUS AND METHOD FOR CONTROLLING THE SAME

(71) Applicant: CANON KABUSHIKI KAISHA, Tokyo (JP)

(72) Inventor: Takuya Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 17/902,491

(22) Filed: Sep. 2, 2022

(65) Prior Publication Data

US 2022/0410588 A1 Dec. 29, 2022

Related U.S. Application Data

(63) Continuation of application No. 16/990,452, filed on Aug. 11, 2020, now Pat. No. 11,458,740.

(30) Foreign Application Priority Data

Aug. 26, 2019 (JP) ................................ 2019-154054

(51) Int. Cl.
*B41J 11/00* (2006.01)

(52) U.S. Cl.
CPC .................................. *B41J 11/002* (2013.01)

(58) Field of Classification Search
CPC ...................................................... B41J 11/002
See application file for complete search history.

(56) References Cited

U.S. PATENT DOCUMENTS 8,182,058 B2 5/2012 Itoh
8,911,050 B2 12/2014 Nishihara
10,201,985 B2 2/2019 Jang et al.
2003/0007055 A1* 1/2003 Ogawa ................ B41J 11/0022 347/102
2004/0189773 A1 9/2004 Masumi et al.
2011/0267393 A1* 11/2011 Okamoto ............ B41J 11/0024 347/61

(Continued)

FOREIGN PATENT DOCUMENTS

JP 2-99338 A 4/1990
JP 11-207943 A 8/1999

(Continued)

OTHER PUBLICATIONS

Office Action dated Jun. 2, 2023, in Japanese Application No. 2019-154054.

(Continued)

*Primary Examiner* — Bradley W Thies
(74) *Attorney, Agent, or Firm* — Venable LLP

(57) ABSTRACT

A printing apparatus includes a conveyance unit configured to convey a sheet, a printing unit configured to print an image by discharging ink to the sheet conveyed by the conveyance unit, a heating unit configured to heat the sheet conveyed by the conveyance unit and to which the image has been printed by the printing unit, and a control unit configured to, in a case of double-side printing in which after printing an image on a first side of the sheet, an image is printed on a second side of the sheet, based on an amount of ink discharged for the first side and an amount of ink discharged for the second side, control heating by the heating unit with respect to the second side.

14 Claims, 13 Drawing Sheets

(56) References Cited

U.S. PATENT DOCUMENTS

| | | | |
|---|---|---|---|
| 2012/0013671 A1 | 1/2012 | Houjou | |
| 2013/0100198 A1 | 4/2013 | Kanome et al. | |
| 2014/0009546 A1 | 1/2014 | Velasco et al. | |
| 2014/0092162 A1 | 4/2014 | Nishihara | |
| 2014/0232797 A1 | 8/2014 | Onodera et al. | |
| 2014/0354728 A1 | 12/2014 | Murata et al. | |
| 2018/0050548 A1 | 2/2018 | Zuza Irurueta et al. | |
| 2018/0339528 A1 | 11/2018 | Ueda et al. | |
| 2019/0193426 A1 | 6/2019 | Mizushima et al. | |
| 2021/0060977 A1 | 3/2021 | Hamada | |
| 2021/0070068 A1 | 3/2021 | Hamada | |

FOREIGN PATENT DOCUMENTS

| | | |
|---|---|---|
| JP | 2001-334647 A | 12/2001 |
| JP | 2002-254517 A | 9/2002 |
| JP | 2004-276264 A | 10/2004 |
| JP | 2012-139820 A | 7/2012 |
| JP | 2013-103480 A | 5/2013 |
| JP | 2013-215982 A | 10/2013 |
| JP | 2014-080011 A | 5/2014 |
| JP | 2015-205476 A | 11/2015 |
| JP | 2015-208966 A | 11/2015 |
| JP | 2017-102704 A | 6/2017 |
| JP | 2018-199546 A | 12/2018 |
| JP | 2019-116055 A | 7/2019 |
| JP | 2019-142085 A | 8/2019 |

OTHER PUBLICATIONS

Office Action dated Sep. 17, 2024, in Japanese Patent Application No. 2023-199568.

* cited by examiner

PRINTING APPARATUS AND METHOD FOR CONTROLLING THE SAME

BACKGROUND OF THE INVENTION

Field of the Invention

The present disclosure is related to a printing technique.

Description of the Related Art

In methods in which ink is discharged to a sheet to thereby print an image, there are cases in which the sheet curls due to moisture included in the ink. Accordingly, techniques for heating the sheet to accelerate drying have been proposed. For example, a technique in which drying is accelerated by blowing hot air onto a sheet on which an image has been printed is disclosed in the specification of US-2018-0050548.

There are cases in which a curl in the sheet occurs due to a difference in the moisture content of the ink on the respective sides of the sheet when an image is printed on both sides of the sheet. Also, there are cases in which a curl in the sheet occurs due to a variation in the drying capability of the respective sides of the sheet in the configuration of the apparatus.

SUMMARY OF THE INVENTION

The present disclosure provides a technique for reducing the curl in a sheet in the case of double-side printing.

According to an aspect of the present invention, there is provided a printing apparatus comprising: a conveyance unit configured to convey a sheet; a printing unit configured to print an image by discharging ink to the sheet conveyed by the conveyance unit; a heating unit configured to heat the sheet conveyed by the conveyance unit and to which the image has been printed by the printing unit; and a control unit configured to, in a case of double-side printing in which after printing an image to a first side of the sheet, an image is printed to a second side of the sheet, based on an amount of ink discharged for the first side and an amount of ink discharged for the second side, control heating by the heating unit with respect to the second side.

Further features of the present invention will become apparent from the following description of exemplary embodiments (with reference to the attached drawings).

DESCRIPTION OF THE EMBODIMENTS

Figure 1:
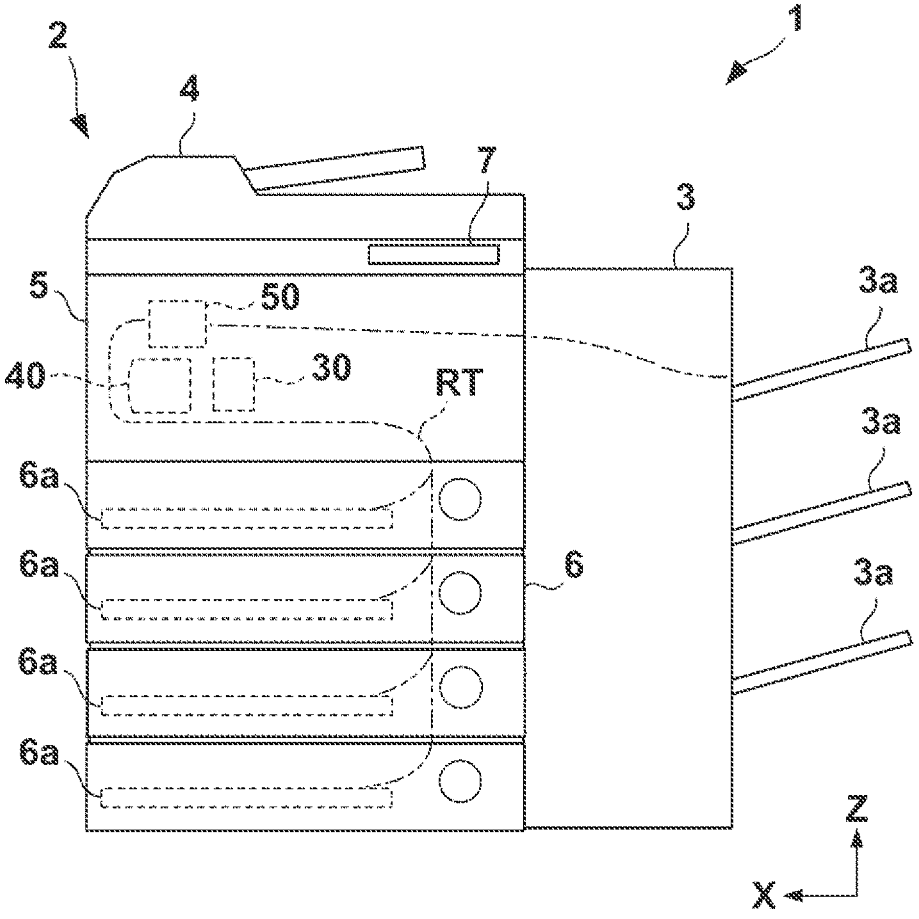
FIG. 1 is a front surface view of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Printing System Configuration>

FIG. 1 is a front surface view of a printing system 1 according to an embodiment of the present invention. An arrow X in each figure including FIG. 1 indicates left and right directions, and an arrow Y indicates the depth direction, and these are orthogonal to each other. An arrow Z indicates a vertical direction.

The printing system 1 includes an apparatus main body 2 and a post-processing apparatus 3. The apparatus main body 2 of the present embodiment is an apparatus that configures a multi-function device, and the apparatus main body 2 comprises a copy function, a scanner function, and a printer function. The apparatus main body 2 includes a reading apparatus 4, a printing apparatus 5, and a feeding apparatus 6, and an operation unit 7 is provided on a front portion of the apparatus main body 2. The operation unit 7 is a user input/output interface, and, for example, includes hard keys, a display unit, or a touch panel that receives user input and displays information, and includes an output unit such as a voice generator.

The reading apparatus 4 includes an ADF (automatic document feeder) and the reading apparatus 4 conveys stacked originals and reads original images. The feeding apparatus 6 is an apparatus for feeding a recording medium to the printing apparatus 5. The recording medium, in the case of the present embodiment, is a sheet of paper or film or the like, and in particular is a cut sheet. There are cases where the recording medium is referred to as a sheet. The feeding apparatus 6 includes a plurality of cassettes **6*a* on which sheets are stacked, and a feeding mechanism (not shown) for feeding sheets from the cassettes 6*a* to the printing apparatus 5** on a conveyance path RT.

The printing apparatus 5 prints an image on a sheet. The printing apparatus 5 includes a printing unit 30 for printing an image by discharging ink onto a sheet and drying acceleration units 40 and 50 for accelerating drying of sheets. Details of the printing apparatus 5 will be described later.

The post-processing apparatus 3 is attached disconnectably to a side of the apparatus main body 2 as an optional apparatus, and is a finisher (sheet processing apparatus) for performing sheet post-processing. The post-processing may be, for example, stacking processing in which sheets discharged from the printing apparatus 5 are stacked on a tray 3*a*, sorting processing in which a plurality of sheets discharged from the printing apparatus 5 are read in order and aligned in a bundle form, stapling processing in which a bundled sheet bundle is bound by a stapler, binding processing, or punch press processing.

<Configuration of the Printing Apparatus>

Figure 2:
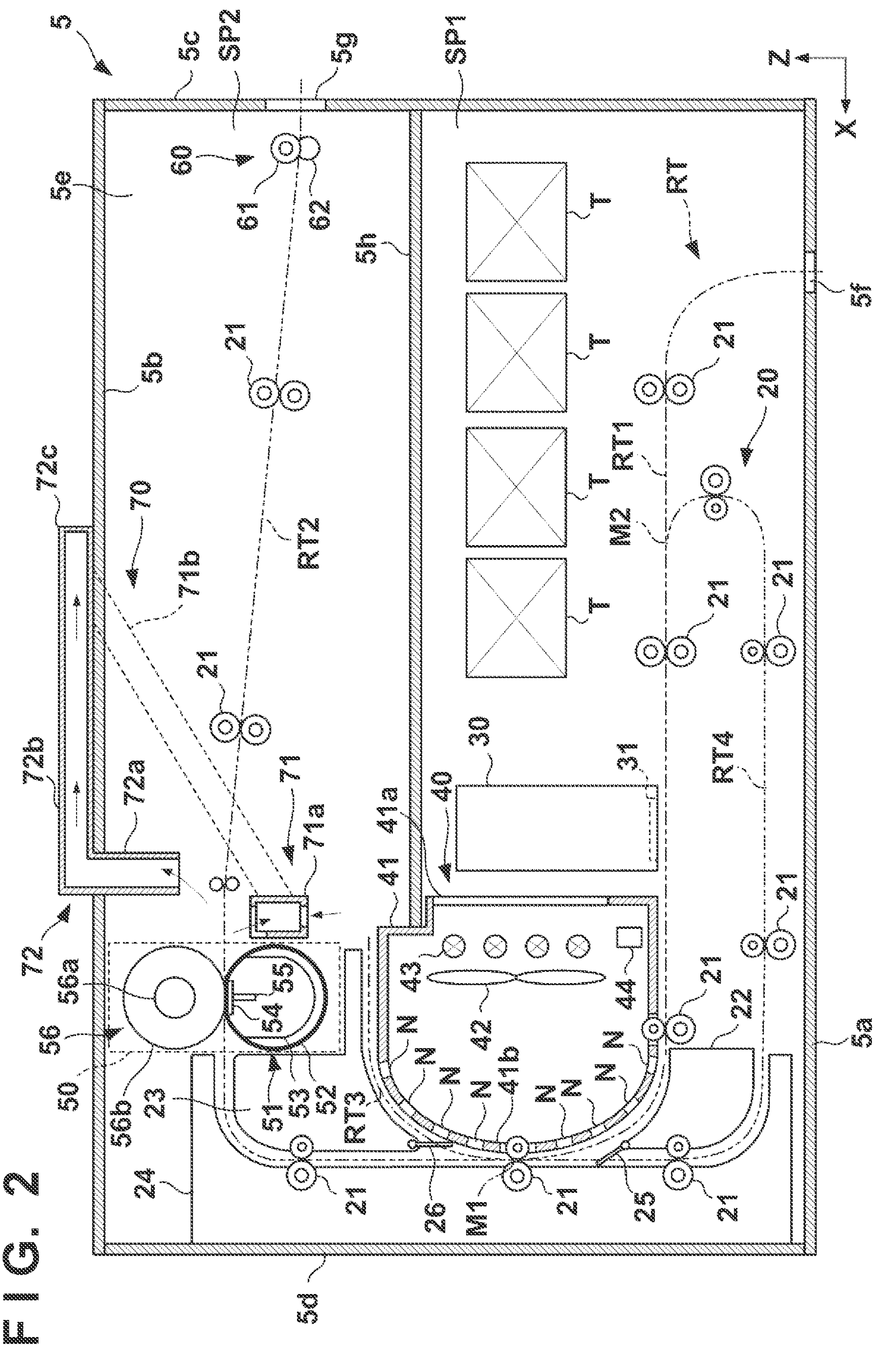
FIG. 2 is a schematic view of a printing apparatus.

FIG. 2 is an explanatory view illustrating an internal structure of the printing apparatus 5. The printing apparatus 5 includes, as frames for supporting internal mechanisms, a bottom wall portion 5*a*, a top wall portion 5*b*, a right wall portion 5*c*, a left wall portion 5*d*, and a back wall portion 5*e*. These walls define the internal space of the printing apparatus 5. The internal space of the printing apparatus 5 is further separated into a bottom space SP1 and a top space SP2 by a partition wall 5*h*. The space SP1 and the space SP2 are not divided hermetically, and communicate with each other.

The bottom wall portion 5*a* has an opening 5*f* through which a sheet that is fed from the feeding apparatus 6 passes. The right wall portion 5*c* has an opening 5*g* through which a sheet that is discharged to the post-processing apparatus 3 passes. The left wall portion 5*d* and the right wall portion 5*c* may be supported so as to be able to open/close, in the form of a door, for maintenance.

The printing apparatus 5 includes a conveyance unit 20, the printing unit 30, the drying acceleration units 40 and 50, a straightening unit 60, and an exhaust unit 70.

<Conveyance Unit>

The conveyance unit 20 is a mechanism for conveying a sheet along a conveyance path RT. The conveyance path RT is a path along which sheets are conveyed whose upstream end is the opening 5*f* and whose downstream end is the opening 5*g* in the case of the present embodiment. The conveyance path RT includes main paths RT1 and RT2, a redirecting path RT3, and an inversion path RT4. The main paths RT1 and RT2 are paths that connect the opening 5*f* to the opening 5*g* through a midpoint M1, and the main path RT1 is from the opening 5*f* to the midpoint M1 and the main path RT2 is from the midpoint M1 to the opening 5*g*. The main paths RT1 and RT2 are paths for conveying a sheet leftward and then upward and then rightward, and the sheet passes, in order, through the printing unit 30, then the drying acceleration unit 40, then the drying acceleration unit 50, and then the straightening unit 60. In the case of one-side printing, in which only one side of the sheet is printed on, the sheet is conveyed through the main paths RT1 and RT2.

The redirecting path RT3 and the inversion path RT4 are paths along which a sheet is conveyed after one-side printing in the case of double-side printing in which both sides of the sheet are printed on. The redirecting path RT3, from the midpoint M1, forms a path separate from the main path RT2. Also, the inversion path RT4 is a path from the midpoint M1 to a merging point M2 part way through the main path RT1, and, via the inversion path RT4, the front and back of a sheet are inverted and the sheet is returned once again to the main path RT1.

When the downstream side and the upstream side are referred to in the discussion below, the conveyance direction of the sheet in the conveyance path RT is the reference.

The conveyance unit 20 includes a driving mechanism that biases a conveying force in relation to a sheet, and a guide that guides the conveyance of the sheet along the conveyance path RT, and part of that is illustrated in FIG. 2. The driving mechanism includes a plurality of conveyance rollers 21 which are driven by a driving source such as a motor. A driven roller or spur is arranged to face each of the conveyance rollers 21. A sheet is conveyed so as to be sandwiched between the conveyance roller 21 and the driven roller or spur. The spur, in order to maintain the quality of a printed image, is arranged so as to contact the side of the printing surface in a region on the downstream side of the printing unit 30. The guide includes guide members 22 to 24. The guide member 24 is supported by the left wall portion 5*d*. Part of the conveyance path RT is formed between the guide member 23 and the guide member 24, and part of the path RT1 is formed between the guide member 22 and the guide member 24.

Figure 3:
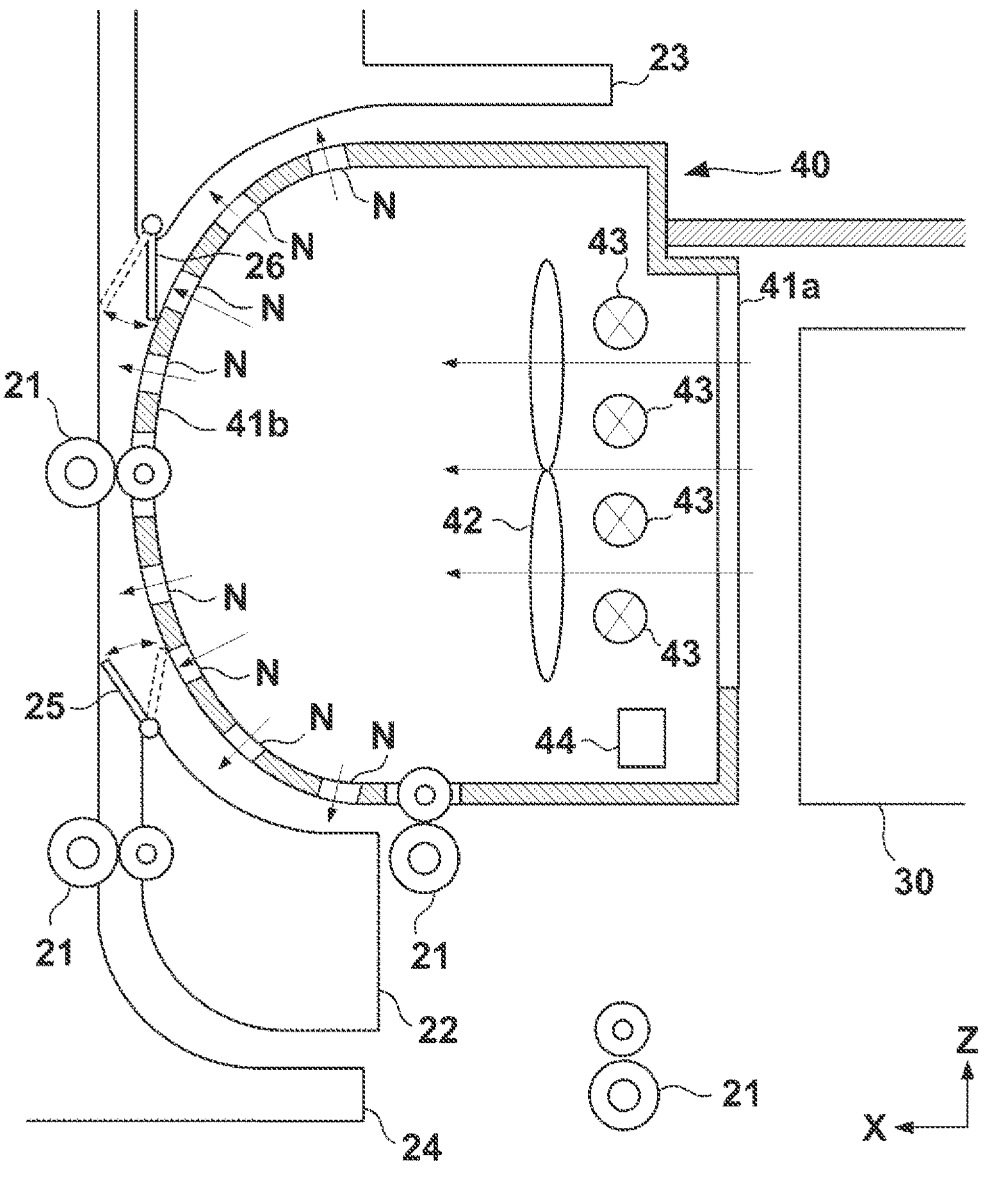
FIG. 3 is an explanatory view of a drying acceleration unit.

The conveyance unit 20 includes path switching units 25 and 26. The path switching units 25 and 26 are units for switching the sheet guidance path, and operate by a driving source such as an electromagnetic solenoid, a motor, or the like. The path switching units 25 and 26 guide the sheet from the main path RT1 to the main path RT2 in the case of one-side printing and, in the case of double-side printing, guide the sheet from the main path RT1 to the redirecting path RT3, and then guide the redirected sheet to the inversion path RT4. FIG. 3 illustrates path switching states of the path switching units 25 and 26. The path switching units 25 and 26 respectively include pivotable flaps, and switch the path by positioning of the flaps. The positioning illustrated in solid lines is the positioning in the case of one-side printing, and the positioning illustrated in dashed lines is the positioning in a case of double-side printing.

<Printing Unit>

Returning to FIG. 2, the printing unit 30 includes a printhead 31, and the printhead 31 is an inkjet head for forming images (ink images) by discharging ink onto a sheet. The ink that the printhead 31 discharges is contained in a plurality of ink tank units T. The ink tank units T are arranged for each type of ink, and the types of ink are, for example, yellow, magenta, cyan, and black color types.

The printhead 31 is arranged for each type of ink. In the case of the present embodiment, each printhead 31 is a full-line head arranged to extend in a Y direction, and nozzles are arranged in a range covering a width of an image printing area of a sheet of a maximum size that can be used. A printhead includes a bottom surface that faces the sheet via a minute gap (of several mm, for example), and an ink discharge surface in which a nozzle is open is formed in this bottom surface.

A discharging element is arranged in each nozzle. The discharging element is, for example, an element that causes pressure to form within the nozzle to discharge ink within the nozzle, and a publicly known inkjet head technique can be applied thereto. The discharging element may be, for example, an element that discharges ink by forming air bubbles by causing film boiling to occur in the ink by an electrothermal transducer, an element that discharges ink by an electromechanical transducer, an element that discharges ink using static electricity, or the like. It is possible to perform high-density printing at high-speed by using a discharging element that uses an electrothermal transducer.

Note that the printing unit 30 may be a serial printing unit in which printing is performed by the reciprocal movement of a printhead arranged on a carriage in a sheet width direction. Also, the ink to be discharged may be of a single type such as when it is only black. It is possible to select a single ink printing mode and a multiple ink type printing mode as the printing mode of the printing unit 30. The ink may mainly contain a coloring agent (a dye or a pigment)

and a solvent component. A water-based material or an oil-based material may be used for the solvent component. As the dye, a water-soluble dye as typified by, for example, a direct dye, an acidic dye, a basic dye, a reactive dye, a food dye, or the like, is preferable, and the dye may be anything that provides an image that satisfies a fixing characteristic, colorability, vividness, stability, lightfastness, or other desired characteristics in combination with the above-described recording medium. A carbon black or the like is preferable for the pigment. A method for using a pigment and a dispersing agent together may be a method using self dispersion pigment or a method of microencapsulation. Also, for the ink, it is possible to add various additives, as necessary, such as a solvent component, a solubilizer, a viscosity modifier, a surfactant, a surface tension adjuster, a pH adjuster, a resistivity adjusting agent, and the like. Also, rather than arranging the printhead 31 for every type of ink, nozzles may be arranged for every type of ink on a single printhead.

<Drying Acceleration Unit>

A sheet, after an image has been printed thereon by the printing unit 30, may expand due to the liquid in the ink and an undulation may form therein. Such a sheet may become the cause of a paper jam in the printing apparatus 5 or of a deterioration in stacking performance/alignment performance in the post-processing apparatus 3. By accelerating sheet drying, it is possible to prevent the expansion of the sheet due to liquid in the ink. The printing apparatus 5 of the present embodiment comprises a plurality of drying acceleration units 40 and 50 that are similar in that they heat the sheet, but whose methods of drying the sheet differ. Note that a predetermined moisture is included in the liquid of the ink.

The drying acceleration unit 40 is a unit that is arranged on the downstream side of the printing unit 30 and that heats the sheet by blowing hot air onto the sheet, thereby accelerating drying of the sheet without contacting the sheet. This configuration will be described with reference to FIG. 2 and FIG. 3.

The drying acceleration unit 40 includes a hollow body 41 that defines an internal space and a fan 42 and a heating element 43 arranged within the hollow body 41. The hollow body 41 comprises an air intake port 41*a* on a right side. The wall 41*b* that forms the left side of the hollow body 41 is a guide wall portion that is also used as a sheet conveyance guide, and the wall 41*b* extends in a Y direction so as to cover the width of the maximum size sheet. A guide wall portion 41*b* has C-shaped cross-sectional shape (cross-section on the X-Z plane), and has a wall surface that faces the guide members 22 to 24. Between this wall and the guide members 22 to 24, a part of the conveyance path RT is formed and the midpoint M1 is present at that part of the conveyance path RT. A large number of hot air outlets N that communicate with the internal space of the hollow body 41 are formed in the guide wall portion 41*b*.

The fan 42 is an electrically driven fan for which a motor is made to be a driving source, and the fan 42 is, for example, a sirocco fan. The fan 42 introduces air into the hollow body 41 from the intake port 41*a*. The air pressure within the hollow body 41 increases due to the introduced air, and the air within the hollow body 41 is blown out of the hollow body 41 from the outlets N. There may be one fan 42 or there may be a plurality of fans 42 arranged adjacently in a Y direction.

The heating element 43 heats the air introduced into the hollow body 41 from the intake port 41*a* by the fan 42. In the case of the present embodiment, the heating element 43 is a rod-like heating element such as an infrared light lamp heater or the like, and the heating element 43 extends in the Y direction. Also, a plurality of heating elements 43 are arranged in a Z direction. The plurality of the heating elements 43 are arranged between the fan 42 and the intake port 41*a*, and the air introduced within the hollow body 41 from the intake port 41*a* is heated when passing through the heating element 43. A temperature sensor 44 is provided in the drying acceleration unit 40, and driving of the heating element 43 is controlled according to a result of detection by the temperature sensor 44.

By such a configuration, the drying acceleration unit 40 blows hot air from the outlets N whose air flow is indicated by the arrows in FIG. 3. By this, the sheet that passes through the conveyance path RT is heated to promote evaporation of the liquid included in the ink image on the sheet, and thereby drying of the sheet can be accelerated.

The drying acceleration unit 50 is arranged on the downstream side of the drying acceleration unit 40, and is a heat fixing device for heating the sheet by contacting the sheet and thereby accelerating the drying. Its structure is described with reference to FIG. 2.

The drying acceleration unit 50 includes a heating member 51 and a roller 56, and these extend in a Y direction so as to cover the width of the sheet of the maximum size. The heating member 51 includes a support member 53 for supporting a heating element 54 which is a heat source. The heating element 54 is, for example, a ceramic heater, and extends in a Y direction. The temperature of the heating element 54 is detected by a temperature sensor 55 as typified by a thermistor, and driving of the heating element 54 is controlled based on detection results.

The support member 53 supports a film 52. The film 52 is configured in a cylindrical shape and extends in a Y direction. The film 52 is supported by the support member 53 so as to be able to freely rotate around the support member 53, and is interposed between the roller 56 and the heating element 54. The film 52, for example, is a single layered film or a multi-layered film whose thickness is 10 μm or more and 100 μm or less. In a case of a single layered film, the material may be PTFE, PFA, or FEP, for example. In the case of a multi-layered film, PTFE, PFA, FEP, or the like, for example, may be coated on a layer of polyimide, polyamide-imide, PEEK, PES, PPS, or the like, or a film of a layered structure to which a coating is applied may be used.

Note that the configuration of the heating member 51 is not limited to this structure, and, for example, configuration may be taken such that a structure comprising a heating element such as a halogen heater is comprised within a hollow metal core axis, and an elastic body such as silicone rubber is coated around the core axis.

The roller 56 is configured to coat the circumferential surface of the core metal 56*a* by the elastic body 56*b* which may be silicone rubber. The roller 56 is crimped to the heating member 51 with a predetermined pressing force, and a nipping portion is formed by the roller 56 and the heating member 51. The roller 56 rotates with a motor as its driving source, and the film 52 rotates together with the roller 56. By such a configuration, it is possible to heat the sheet while it is being conveyed in the nipping portion, and thereby promote drying of the sheet.

In the present embodiment, the sheet is dried in two stages by the drying acceleration units 40 and 50, but configuration may be such that only one of the drying acceleration units is arranged.

<Straightening Unit>

The straightening unit 60 is a mechanism for straightening the curvature ("curl" here) of the sheet. In the case of the present embodiment, the straightening unit 60 includes a large-diameter drive roller 61 and a small-diameter driven roller 62. The drive roller 61 is a roller in which the circumference of a core metal is coated by an elastic body such as silicone rubber. The driven roller 62 is a metal roller. The drive roller 61 and the driven roller 62 press against each other. When a sheet passes between the drive roller 61 and the driven roller 62, pressure is applied to the sheet by these rollers, and it is possible to straighten a curl in the sheet. The straightening unit 60 can add a straightening force in a direction of projection, upward, for example, in relation to the sheet. In such a case, it is possible to straighten a sheet having a convex curl downward by the straightening unit 60 so that the sheet has a flatter shape.

<Exhaust Unit>

The exhaust unit 70 is a unit for discharging air within the printing apparatus 5 to the outside of the apparatus. The printing apparatus 5 of the present embodiment comprises the drying acceleration units 40 and 50, and these increase the temperature within the apparatus. Also, these act to cause moisture in the ink to evaporate. In a case where printing is performed consecutively in relation to a large number of sheets, the humidity level within the apparatus may rise. A high humidity level may cause curving of sheets. Between the drying acceleration unit 50 and the opening 5*g*, the sheet conveyance distance is comparably long, and moreover, the sheet is conveyed within the upper space SP2 in which water vapor tends to be retained. There are cases in which sheets are exposed to a high humidity level environment in the space SP2. The humidity level within the apparatus can be lowered by discharging air within the space SP2 to the outside of the apparatus by the exhaust unit 70.

Figure 4:
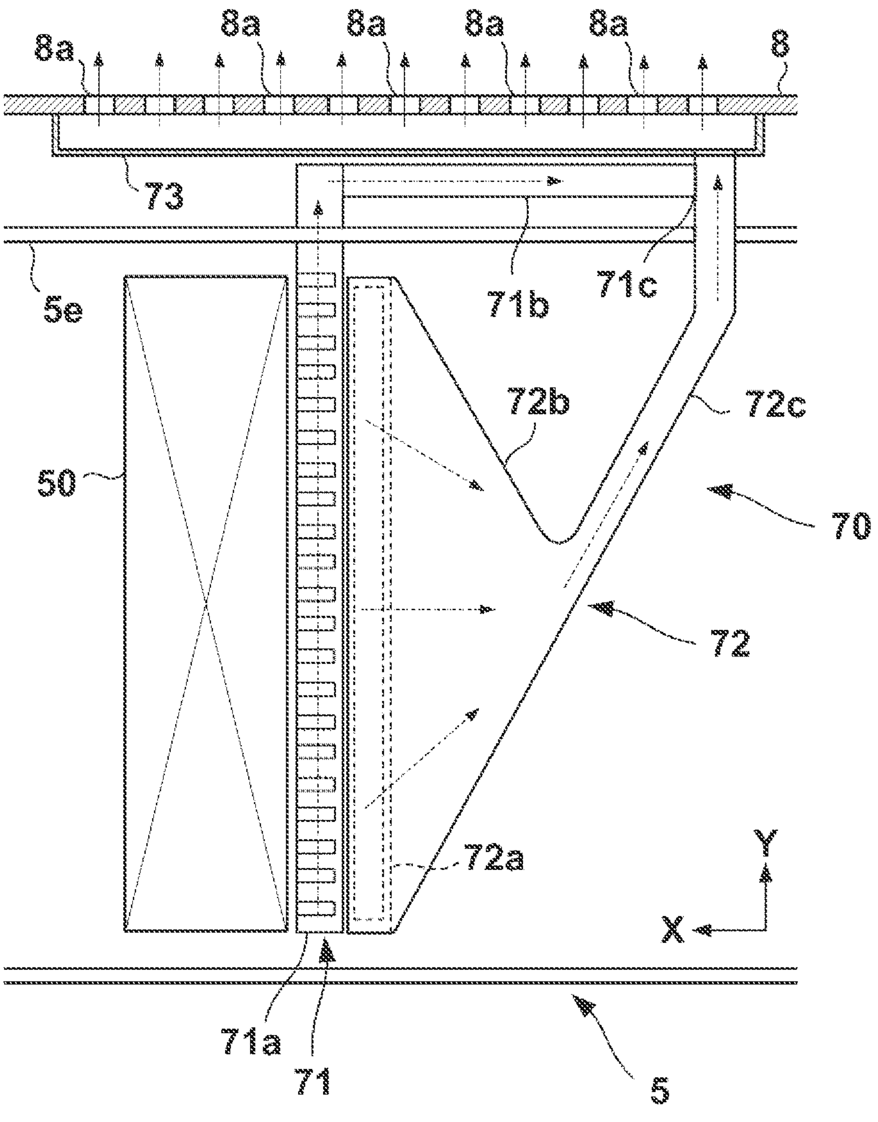
FIG. 4 is an explanatory view of an exhaust unit.

The exhaust unit 70 of the present embodiment is a structure that naturally discharges air within the space SP2 by the plurality of exhaust ducts 71 to 73. However, configuration may be taken such that the exhaust unit 70 forcibly discharges air within the apparatus by a fan or the like. With reference to FIG. 2 and FIG. 4, the structure of the exhaust unit 70 will be described. FIG. 4 is a plan view illustrating the vicinity of the exhaust unit 70, and the top wall portion 5*b* is omitted from the illustration.

An exhaust duct 71 is a tubular member including an extension 71*a* that extends in a Y direction and an extension 7*b* that extends from the end on the far side in the Y direction of the extension 71*a* to the right side in the X direction. The extension 71*a* extends at a position in the vicinity of the sheet discharge position in the drying acceleration unit 50 and below the main path RT2. The extension 71*a* is an air intake portion in which a plurality of slits for air intake ports are formed on the upper left-side and bottom. From the upper left-side slit, air that was warmed by the drying acceleration unit 50, for example, is introduced, and from the bottom slit, for example, it is possible for hot air blown out from the outlets N of the drying acceleration unit 40 to be introduced. The extension 71*a* is arranged to extend across the back wall portion 5*e*, and its end on the far side in the Y direction and the extension 7*b* are positioned outside (the far side in the Y direction) of the space SP2. Note that the extension 71*a* may be of a form that extends at a position on the top side of the main path RT2.

An exhaust duct 72 is a tubular member that includes an extension 72*a* that extends in the Y direction, a collection unit 72*b* that extends from the extension 72*a* to the right side, and an extension 72*c* that extends from the right end of the collection unit 72*b* to the far side of the Y direction. The extension 72*a* extends at a position in the vicinity of the sheet discharge position in the drying acceleration unit 50 and above the main path RT2. The bottom of the extension 72*a* opens to form an air intake port, and for example, air warmed by the drying acceleration unit 50 and water vapor in the space SP2 is introduced. The extension 72*a* crosses the top wall portion 5*b* and protrudes above the top wall portion 5*b*.

For the collection unit 72*b*, the extension 72*a* side in the plan view has a wide triangular shape, and its entirety is positioned above the top wall portion 5*b*. The collection unit 72*b* collects air introduced to the extension 72*a* in the center in the Y direction on the right end. The collected air flows to the extension 72*c*. The entirety of the extension 72*c* also is positioned above the top wall portion 5*b*, and partially warped and extends to the far side of the back wall portion 5*e*. In the far side of the back wall portion 5*e*, the extension 7*b* of the exhaust duct 71 is connected to the extension 72*c* of the exhaust duct 72, and these internal spaces communicate. The extension 72*c* is connected to an exhaust duct 73.

The exhaust duct 73 extends in the X direction and is an exhaust member open to the far side in the Y direction. The opening of the exhaust duct 73 faces a cover 8 that forms the exterior of the rear side of the apparatus main body 2. A large number of slits (louver) 8*a* are formed in the cover 8, and the air that has flowed into the exhaust duct 73 is discharged to the outside of the apparatus from the rear side of the apparatus main body 2 through the slits 8*a*.

<Control Unit>

Figure 5:
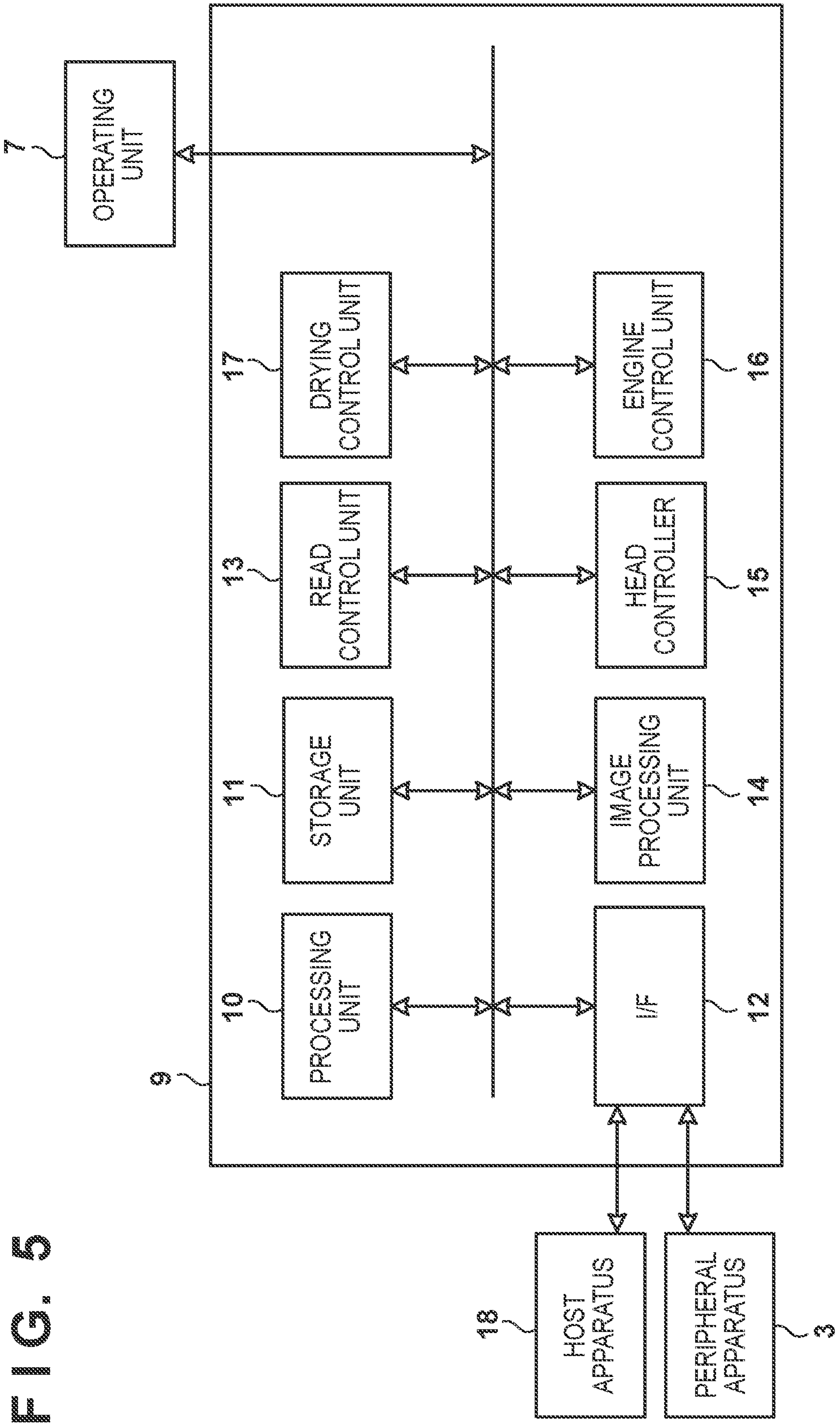
FIG. 5 is a block diagram of a control unit of an apparatus main body.

A control system of the apparatus main body 2 will be described. FIG. 5 is a block diagram of a control unit 9 of the apparatus main body 2. The control unit 9 comprises a processing unit 10, a storage unit 11, a read control unit 13, an image processing unit 14, a head controller 15, an engine control unit 16, and a drying control unit 17. The processing unit 10 is a processor as typified by a CPU (central processing unit), and comprehensively controls operation of each unit of the apparatus main body 2. The storage unit 11 is a storage device such as a ROM or a RAM, for example. In the storage unit 11, programs for the processing unit 10 to execute and fixed data (for example, data related to the type of sheets stored in each cassette 6*a*) necessary for various operations of the apparatus main body 2 are stored. Also, the storage unit 11 stores various setting data in a work area for the processing unit 10 or a temporary storage region for various received data.

The read control unit 13 controls the reading apparatus 4. The image processing unit 14 performs image processing for image data that the apparatus main body 2 handles. The inputted image data color space (for example, YCbCr) is converted into a standard RGB color space (for example, sRGB). The print data obtained by such image processing is stored in the storage unit 11. The head controller 15 performs control for driving the printing unit 30 in accordance with print data based on control commands received from the processing unit 10. The engine control unit 16 performs sheet conveyance control and the like. The drying control unit 17 performs control for driving the drying acceleration units 40 and 50. Each of these control units includes a processor such as a CPU, a storage device such as a RAM or a ROM, and an interface for an external device.

An I/O 12 is an interface (I/F) for connecting the control unit 9 with a host apparatus 18 and the post-processing apparatus 3, and is a local I/F or a network I/F. The host apparatus 18 is an apparatus that is an image data supply source for causing the printing apparatus 5 to perform a printing operation. The host apparatus 18 may be a general-purpose or dedicated computer, and may be a dedicated image device such as an image capturing device having an image reader unit, a digital camera, or a photo storage.

Operation Example

An example of a printing operation by the printing apparatus 5 according to control by the control unit 9 will be described with reference to FIG. 6 to FIG. 9. First, with reference to FIG. 6 and FIG. 7, operation in a case where an image is printed on one side of a sheet will be described. In a case of printing an image on one side of a sheet, the path switching units 25 and 26 are set at the positions for the case of the one-side printing (the positioning illustrated in solid lines in FIG. 3A). The heating element 43 of the drying acceleration unit 40 and the heating element 54 of the drying acceleration unit 50 may be kept at a temperature that is predetermined in advance.

Figure 6:
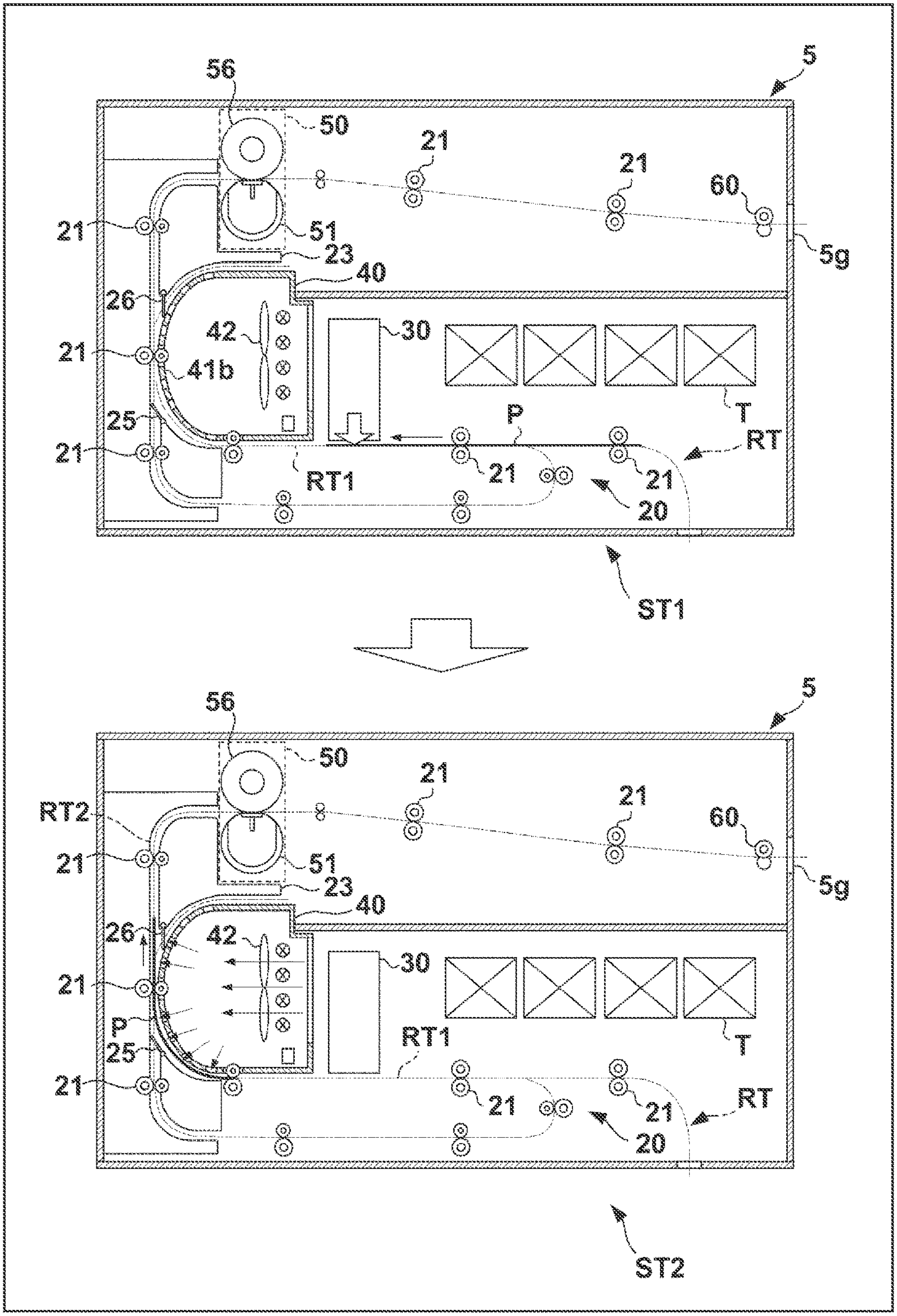
FIG. 6 is an explanatory view for operation of the printing apparatus of FIG. 2.

The state ST1 of FIG. 6 indicates a state in which a sheet P fed from the feeding apparatus 6 is conveyed by the conveyance unit 20 on the main path RT1 to the printing unit 30, and printing by the printing unit 30 is started. The printing unit 30 prints the image by discharging ink to the sheet P as illustrated by the arrow. The sheet P is conveyed towards the drying acceleration unit 40. The drying acceleration unit 40 starts operating, and hot air is blown, as illustrated in state ST2 of FIG. 6, to the conveyed sheet P. Drying of the sheet P which is wet from the ink is accelerated by the hot air.

The sheet P is further conveyed toward the drying acceleration unit 50 on the main path RT2. The drying acceleration unit 50 starts operating, and the sheet P is conveyed by the roller 56 rotating as illustrated in the state ST3 of FIG. 7 and the sheet P is heated by the heating member 51. The drying of the sheet P is further accelerated thereby.

Figure 7:
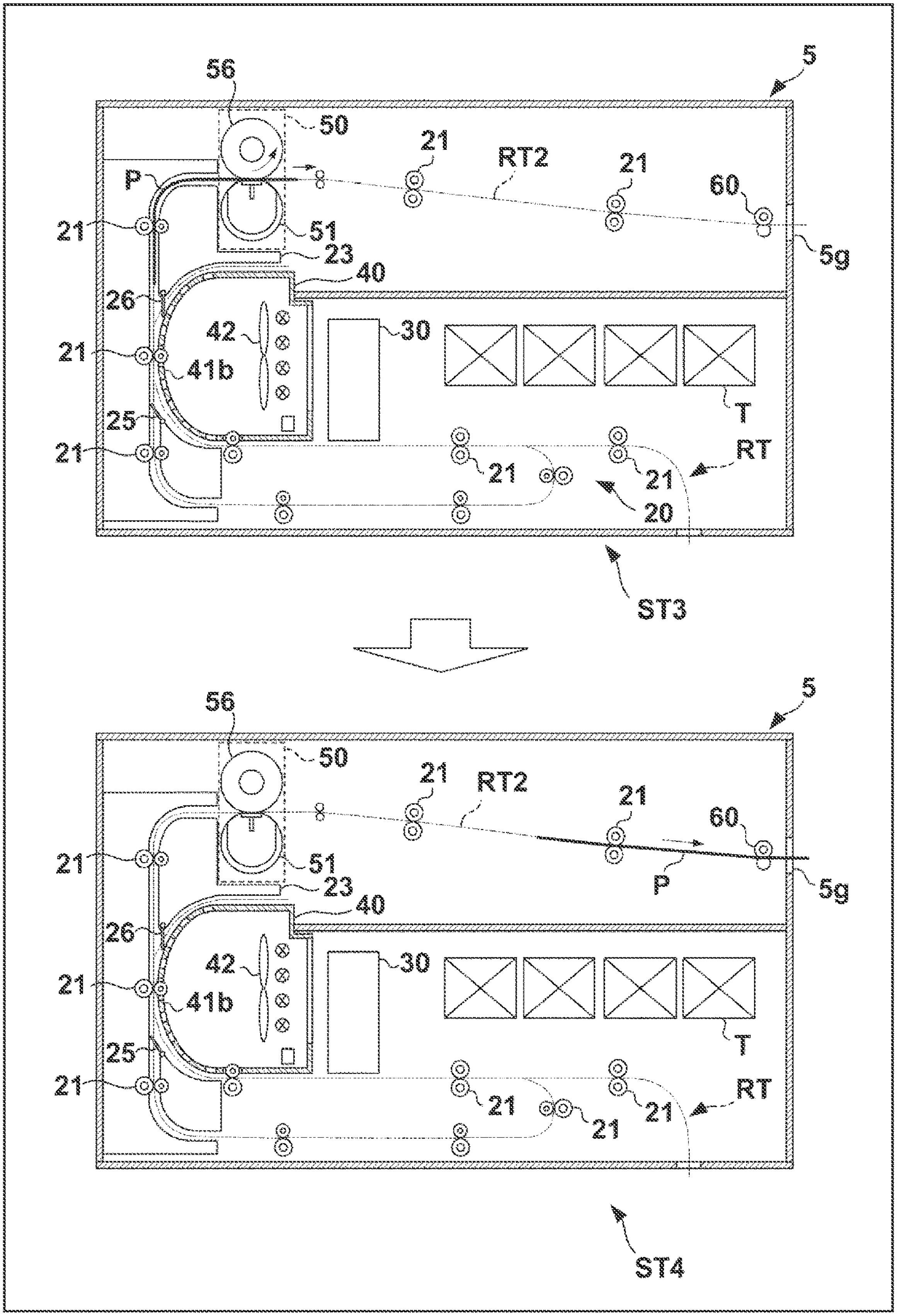
FIG. 7 is an explanatory view for operation of the printing apparatus of FIG. 2.

The sheet P is further conveyed toward the straightening unit 60 on the main path RT2 as illustrated in the state ST4 of FIG. 7. The straightening unit 60 starts operating, a curl in the sheet P is straightened and the sheet P is discharged to the post-processing apparatus 3 from the opening 5*g*.

Next, with reference to FIG. 8 and FIG. 9, operation in a case where an image is printed on both sides of a sheet will be described. The state ST11 of FIG. 8 indicates a state in which a sheet P fed from the feeding apparatus 6 is conveyed by the conveyance unit 20 on the main path RT1 to the printing unit 30, and printing by the printing unit 30 is started. The printing unit 30 prints the image to by discharging ink to the front side of the sheet P as illustrated by the arrow. The path switching unit 26 is set to the position for the case of double-side printing (the positioning illustrated by dashed lines in FIG. 3A).

The sheet P is conveyed towards the drying acceleration unit 40. The drying acceleration unit 40 starts operating, and hot air is blown, as illustrated in state ST12 of FIG. 8, to the conveyed sheet P. Drying of the sheet P which is wet from the ink is accelerated by the hot air. By the guidance of the path switching unit 26, the sheet P, rather than being conveyed to the drying acceleration unit 50, is conveyed to the redirecting path RT3. When the trailing edge of the sheet P passes the position of the path switching unit 25, the path switching unit 25 is set to the position for double-side printing. Then, the conveyance unit 20 conveys (redirecting conveyance) the sheet P on the redirecting path RT3 in the reverse direction.

Figure 8:
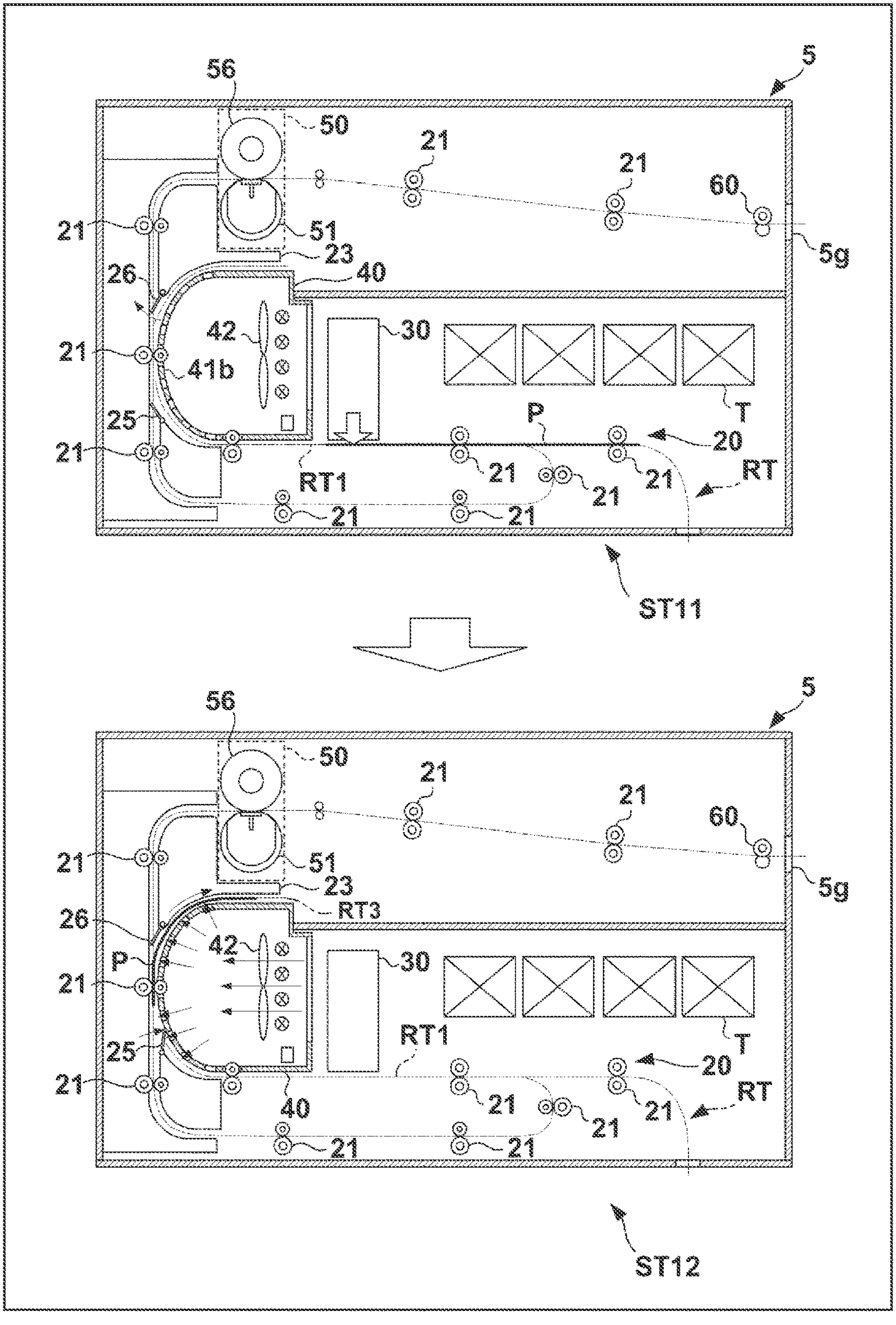
FIG. 8 is an explanatory view for operation of the printing apparatus of FIG. 2.
Figure 9:
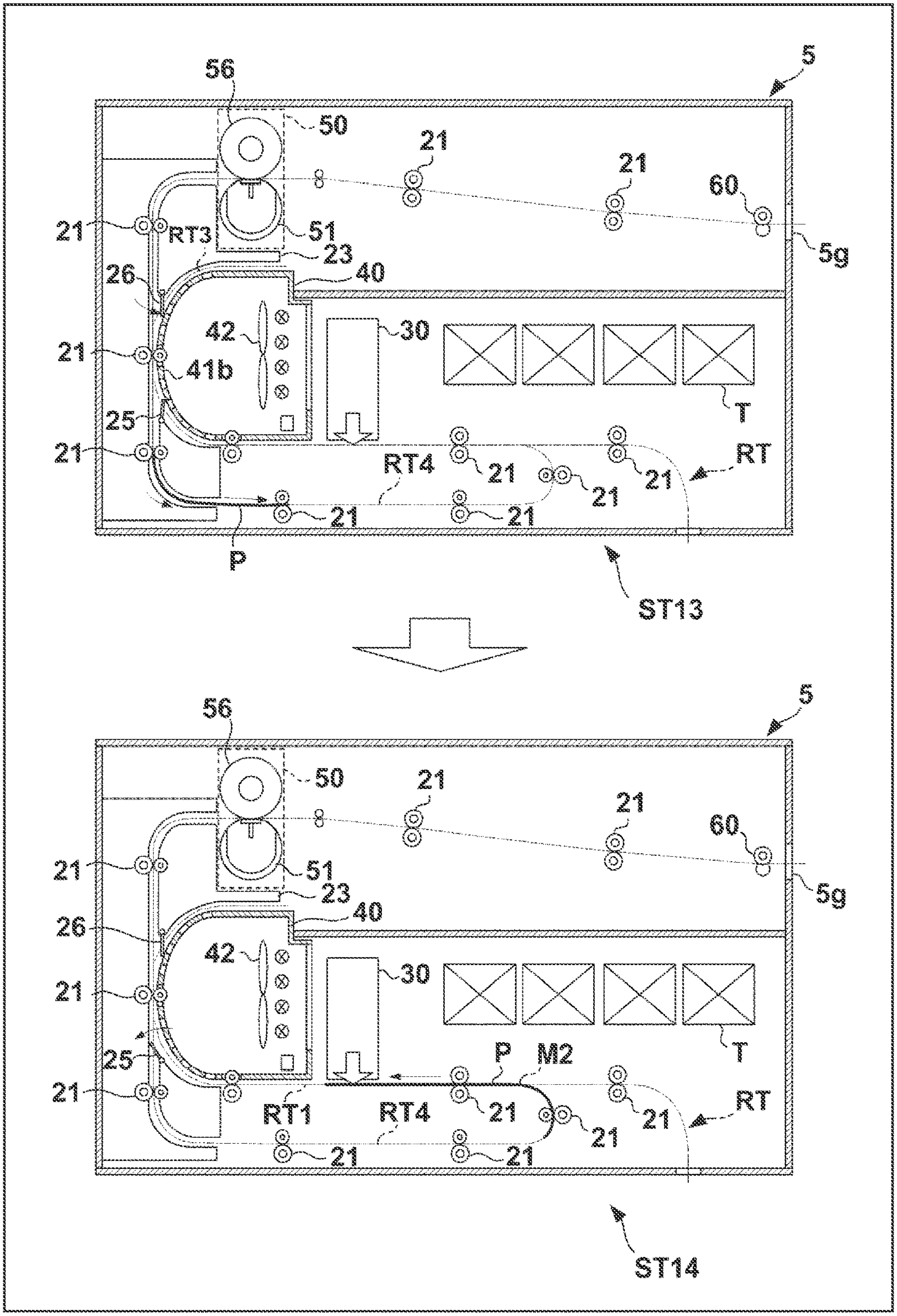
FIG. 9 is an explanatory view for operation of the printing apparatus of FIG. 2.

By guidance of the path switching unit 25, the sheet P is conveyed to the inversion path RT4 as indicated by the state ST13 of FIG. 8. Also, the sheet P is returned to the main path RT1 as illustrated by the state ST14 of FIG. 8. The path switching unit 25 is set to the position (the positioning illustrated by the solid lines in FIG. 3A) in the case of the one-side printing. The printing unit 30 prints the image by discharging ink to the back side of the sheet P as illustrated by the arrow. The operation after that is the same as in the states ST2 to ST4 of the case of one-side printing.

<Example of Drying Control in the Case of Double-Side Printing>

In the case of double-side printing, a difference in ink moisture content may arise between the front/back of the sheet P. This difference in moisture content may become the cause of a curl in the sheet P. The difference in moisture content is due to a difference in the images printed respectively on the front/back sides of the sheet P (a difference in the amount of ink) and a difference in the structure of the printing apparatus 5 related to drying of the sheet P, specifically a difference between the capability to dry the front side and the capability to dry the back side by the drying acceleration units 40 and 50. The drying capability of the drying acceleration units 40 and 50 in the present embodiment will be described. In the description below, the front side means the side of the sheet P on which an image is first printed, and the back side means the side on which an image is printed after.

The drying acceleration unit 40 of the present embodiment is arranged on one side of the conveyance path RT of the sheet P, and hot air is configured to blow only on one side of the sheet P. Accordingly, while drying of both sides is accelerated, the drying on the one side that the hot air directly hits is more accelerated. In the case of one-side printing, hot air is blown on the image printing side of the sheet P. In the case of the double-side printing, in the stage in which an image is printed to the front side of the sheet P, hot air is blown on the front side, and in the stage in which an image is printed on the back side, hot air is blown on the back side.

The drying acceleration unit 50 of the present embodiment is a configuration in which the heating member 51 (the heating element 54) is arranged on one side of the conveyance path RT of the sheet P, and the heating member 51 contacts only one side of the sheet P and heats it. Accordingly, while heat reaches both sides of the sheet P and drying is accelerated, the drying is more accelerated on the one side that the heating member 51 contacts directly. In the case of one-side printing, the heating member 51 contacts the image printing side of the sheet P. In the case of double-side printing, the heating element 54 faces the back side of the sheet P, and the heating member 51 contacts only the back side, and there is no stage in which the heating member 51 contacts the front side of the sheet P.

Figure 10A:
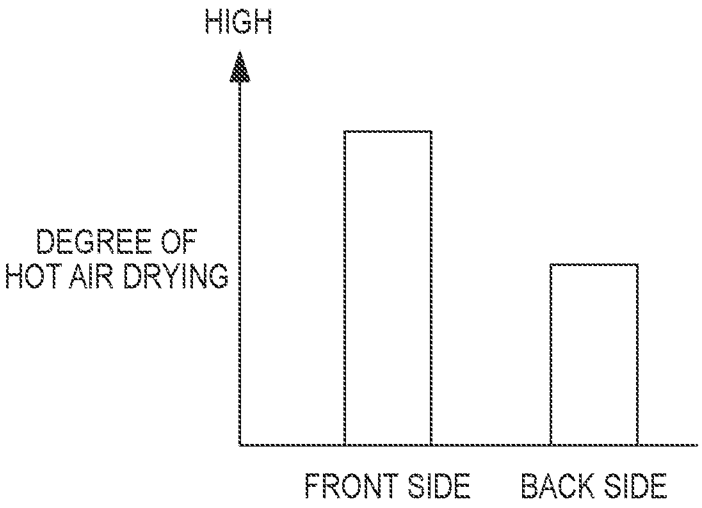
FIG. 10A and FIG. 10B are explanatory views for a degree to which front/back sides of a sheet are dried by a drying acceleration unit.
Figure 10B:
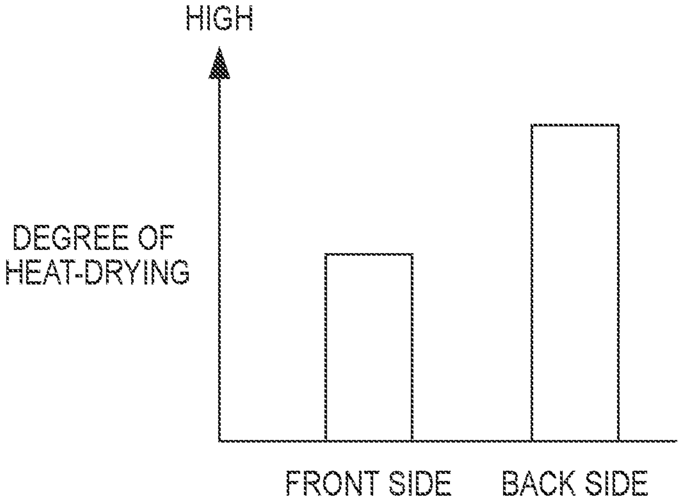

FIG. 10A and FIG. 10B illustrate a difference in the degree to which each side is dried in a case where the drying acceleration units 40 and 50, in double-side printing, are driven under the same condition for front/back sides.

FIG. 10A illustrates a difference in the degree of drying by the hot air drying by the drying acceleration unit 40. In the case of double-side printing, after an image is printed to the front side of the sheet P, a redirecting conveyance of the sheet P is carried out (step S12 of FIG. 8) over the redirecting path RT3. In the case of the present embodiment, the hot air is blown by the drying acceleration unit 40 onto the front side of the sheet P at the time of the redirecting conveyance as well. Meanwhile, after the image has been printed to the back side of the sheet P, similarly to the case of one-side printing, the sheet P is conveyed to the drying acceleration unit 50 without being conveyed to the redirecting path RT3. Accordingly, there is a tendency for the degree of drying to be higher for the front side compared to the back side.

FIG. 10B illustrates the difference in the degree of drying by heating by the drying acceleration unit 50. In the case of double-side printing, the heating member 51 contacts only the back side of the sheet P. Accordingly, there is a tendency for the degree of drying of the back side to be higher than the front side.

Also, considering the overall difference in the degree of drying by the drying acceleration units 40 and 50, there is a tendency for the degree of drying of the front side to be higher due to the high degree of drying by hot air.

Based on this tendency of the drying acceleration units 40 and 50 and the capacity to straighten the curl of the sheet P by the straightening unit 60, it is possible to reduce the curl in the sheet if the degree of drying each side of the sheet P is controlled in accordance with the amount of ink discharged for the images printed on the respective sides.

Figure 11A:
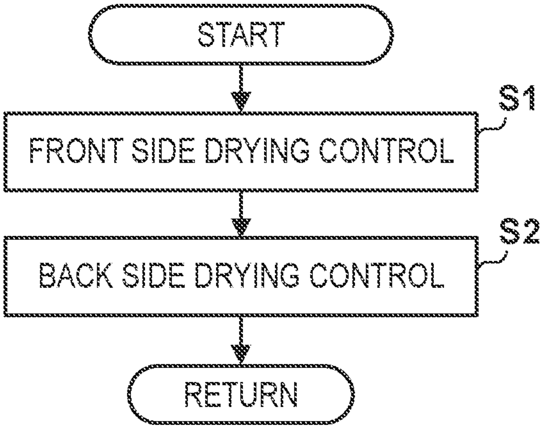
FIG. 11A to FIG. 11C are flowcharts illustrating an example of processing of a control unit.
Figure 11B:
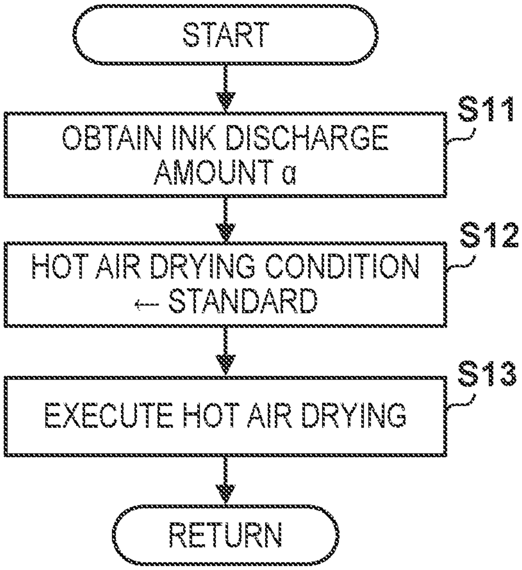
Figure 11C:
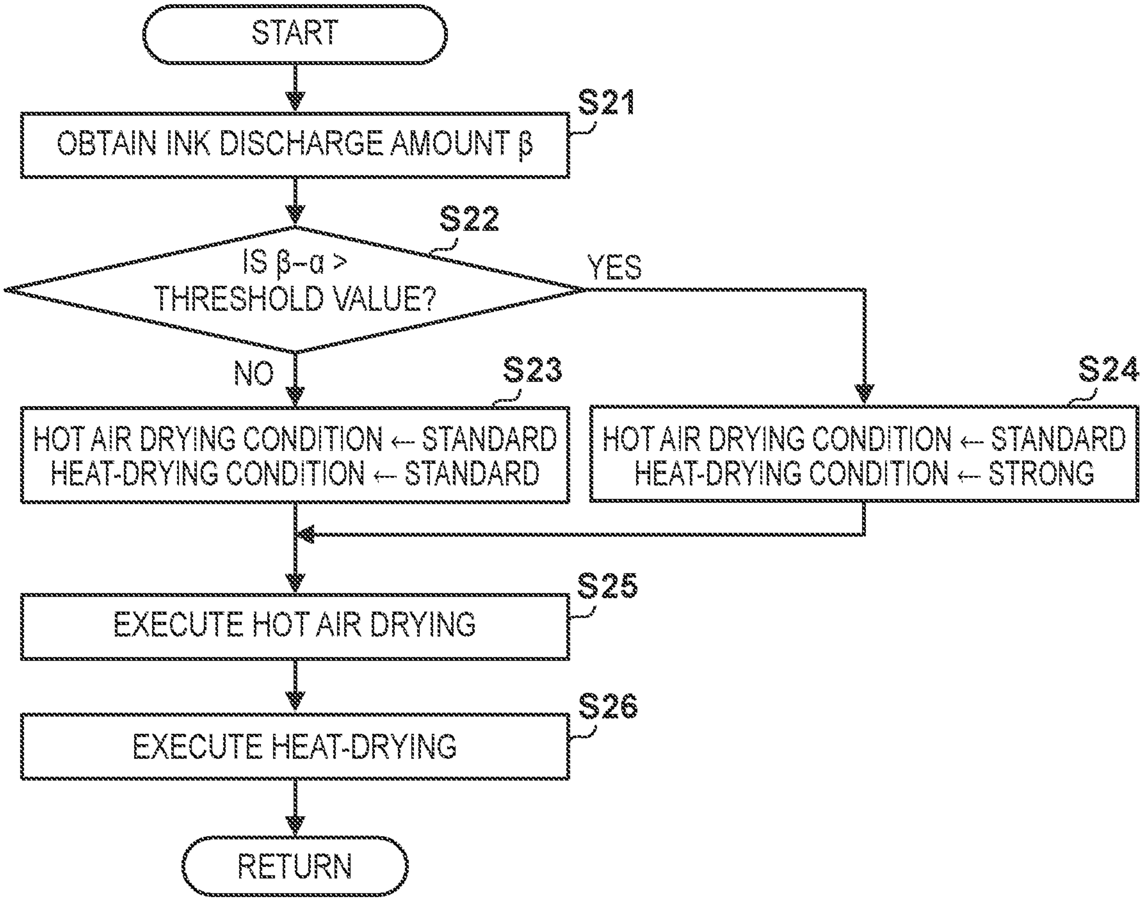

The degree of drying of each side of the sheet P, specifically the difference in the moisture content on the front/back sides of the sheet P can be controlled by controlling the drying acceleration units 40 and 50 in accordance with the amount of ink discharged for the images printed on the respective sides. It is possible to make both the drying acceleration units 40 and 50 the targets of control, but the drying acceleration unit 50 has better responsiveness than the drying acceleration unit 40 in that the heating member 51 contacts the image printing side. In the present embodiment, by controlling the heating with respect to the image printing side of the sheet P by the drying acceleration unit 50, the difference in moisture content between the front/back sides of the sheet P is controlled. FIG. 11A to FIG. 11C are flowcharts illustrating an example of this control. The processing of these figures is processing for controlling the drying acceleration units 40 and 50 that the drying control unit 17 executes in the case of double-side printing.

With reference to FIG. 11A, in step S1, control for drying the front side of the sheet P is executed. FIG. 11B is a flowchart thereof. In step S11, an ink discharge amount α for forming an image on the front side of the sheet P is obtained. Configuration may be taken such that the discharge amount α is calculated by, for example, the image processing unit 14 or the head controller 15, and the calculation result is obtained by the drying control unit 17. As another example, the drying control unit 17 may calculate the discharge amount α from the image data or the print data. The discharge amount α may be calculated by counting the number of ink discharges that the printhead 31 actually performs, for example. Alternatively, the discharge amount α may be a value estimated by calculation based on the image data or the print data.

In step S12, the hot air drying condition is set to a preset standard value. The hot air drying condition is a driving condition of the drying acceleration unit 40, and for example, is at least one of the amount of heat generation by the heating element 43 and the airflow rate of the fan 42. In step S13, the drying acceleration unit 40 is driven according to the condition set in step S12, and hot air drying of sheet P conveyed to the drying acceleration unit 40 is thereby executed. By this, hot air is blown onto the image formed on the front side of the sheet P, and drying of the ink is promoted. In parallel to the processing of step S12, the sheet P is conveyed to the redirecting path RT3 (step ST12 of FIG. 8), and thereafter is conveyed to the inversion path RT4 (step ST13 of FIG. 9).

Returning to FIG. 11A, in step S2, control for drying the back side of the sheet P is executed. FIG. 11C is a flowchart therefor. In step S21, an ink discharge amount β for forming an image on the back side of the sheet P is obtained. Similarly to the discharge amount α, the discharge amount β may be calculated by, for example, the image processing unit 14 or the head controller 15, and the calculation result obtained by the drying control unit 17. As another example, the drying control unit 17 may be calculated based on the image data or the print data. Also, similarly to the discharge amount α, the discharge amount β may be calculated by counting the number of ink discharges actually performed by the printhead 31, for example, and may be a value estimated by calculation based on the image data or the print data.

Note that the discharge amount α and the discharge amount β may be the amount of ink discharged for the whole image printed on the front side and the back side of the sheet P, and may be the amount of ink discharged for the image printed on the front side and the back side of a predetermined region of the sheet P.

In step S22, the amount of ink discharged α obtained in step S11 is compared with the amount of ink discharged β obtained in step S21, and it is determined whether the difference (β−α) exceeds a threshold value. The threshold value is a value for determining whether a large curl will be produced in the sheet P due to the difference, and it can be set by experimentation in advance. The threshold value may be a fixed value, and may be a variable value that changes depending on print conditions (for example, the material or thickness of the sheet P). The threshold value may be 0, and in that case, only the magnitude relationship between the amount of ink discharged α and the amount of ink discharged β is determined.

In a case where the difference does not exceed the threshold value, it is treated as though a large curl will not occur in the sheet P, and the processing advances to step S23. In the case where the difference exceeds the threshold value, the amount of ink discharged to the back side will be excessive in relation to the moisture content of ink on the front side of the sheet P, and it is treated as though a large curl will occur in the sheet P, and the processing advances to step S24.

In step S23, the hot air drying condition and the heating drying condition are respectively set to standard values set in advance. The heating drying condition is a driving condition for the drying acceleration unit 50, and is at least one of the amount of heat generation of the heating element 54 and the conveyance speed (the rotation speed of the roller 56) of the sheet P. Meanwhile, in step S24, the hot air drying condition is set to a standard value set in advance, but the heating drying condition is set to a strong value. The strong value is a value by which the degree of heating with respect to the sheet P is increased with respect to the standard value. For example, making the amount of heat generation by the heating element 54 larger, or making the conveyance speed of the sheet P that passes through the drying acceleration unit 50 slower, or a combination of these are possible. Since the back side of the sheet P is heated more strongly by the drying acceleration unit 50 with the setting of step S24, more than the setting in step S23, the drying thereof is accelerated. By this, the difference in the moisture content on front and back sides of the sheet P can be kept within a predetermined range (a range in which a large curl does not occur).

In step S25, the drying acceleration unit 40 is driven according to the condition set in step S23 or step S24, and hot air drying of sheet P conveyed to the drying acceleration unit 40 is thereby executed. By this, the hot air is blown onto the image formed on the back side of the sheet P, and drying of the ink is encouraged. In step S26, the drying acceleration unit 50 is driven depending on the condition set in step S23 or in step S24, and the drying by heating the sheet P conveyed to the drying acceleration unit 50 is executed. The back side of the sheet P is heated thereby, and drying of the ink is encouraged.

As described above, by virtue of the present embodiment, based on the amount of ink discharged α of the front side of the sheet P and the amount of ink discharged β of the back side of the sheet P, the heat-drying condition is switched between a standard value and a strong value, and it is possible to keep the difference in moisture content between the front/back sides within a predetermined range. Accordingly, it is possible to reduce a curl in the sheet P in the case of double-side printing.

Note that, in the present embodiment, as the heat-drying condition, two types of values, standard (step S23) and strong (step S24) can be set, but configuration may be taken to set three or more types of values. For example, configuration may be taken so as to set three types (standard, somewhat strong, and strong), and select one of these in accordance with the size of the difference between the amount of ink discharged α and the amount of ink discharged β. The multiple types of heat-drying conditions may be defined depending on a combination of the amount of heat generation by the heating element 54 and the conveyance speed of the sheet P. For example, for the standard setting, heat generation amount: standard, conveyance speed: standard may be set; for the somewhat strong setting: heat generation amount: strong, conveyance speed: standard may be set; and for the strong setting: heat generation amount: strong, conveyance speed: slow may be set.

Also, in the present embodiment, regarding the hot air drying condition, in both the cases of step S23 and step S24, standard is set, but similarly to the heat-drying condition, configuration may be taken to change the setting based on the amount of ink discharged α and the amount of ink discharged β. For example, in step S24, configuration may be taken so as to be able to set a strong value as the hot air drying condition. As this setting, at least one of making the heat generation amount by the heating element 43 larger and making the airflow rate of the fan 42 larger may be used.

Also, in the present embodiment, the hot air drying condition for the front side of the sheet P was always set to the standard value (step S12), but it may be changed depending on the amount of ink discharged α. For example, in the case of a remarkably small amount of ink discharged α, it is expected that the difference in moisture between the amount of ink discharged α and the amount of ink discharged β will be large, and therefore configuration may be taken so as to make the hot air drying condition a weak value. The weak value is a value by which the degree of drying with respect to the sheet P is weakened with respect to the standard value. For example, it is possible to make the heat generation amount of the heating element 43 smaller, to make the airflow rate of the fan 42 smaller, or to do a combination of these. Conversely, in the case where the amount of ink discharged β is remarkably large, it is expected that the moisture difference between the amount of ink discharged α and the amount of ink discharged β will be large, and so configuration may be taken to set a strong value for the hot air drying condition. The strong value is a value for which the degree to which the sheet P is dried is stronger than the standard value. For example, the heat generation amount of the heating element 43 may be increased, the airflow rate of the fan 42 may be increased, or a combination of these may be performed.

Also, as control for heating the sheet P in the drying acceleration unit 50 in the case of double-side printing, configuration may be taken to set the amount of heat generation of the heating element 54 to be fixed, and to change only the conveyance speed (the rotation speed of the roller 56) of the sheet P in accordance with the size of the difference between the amount of ink discharged α and the amount of ink discharged β. For example, in the case where the difference is large, the amount of heat on the back side of the sheet P is increased by relatively slowing the conveyance speed, and in the case where the difference is small, the amount of heat on the back side of the sheet P is decreased by relatively increasing the conveyance speed, to increase the throughput. In terms of the processing example of FIG. 11C, the conveyance speed can be set to two types of settings in the processing of step S23 and step S24, but there is no limitation to this, and configuration may be taken so as to be able to set three or more types of conveyance speeds in accordance with the size of the difference between the amount of ink discharged α and the amount of ink discharged β.

Second Embodiment

Figure 12A:
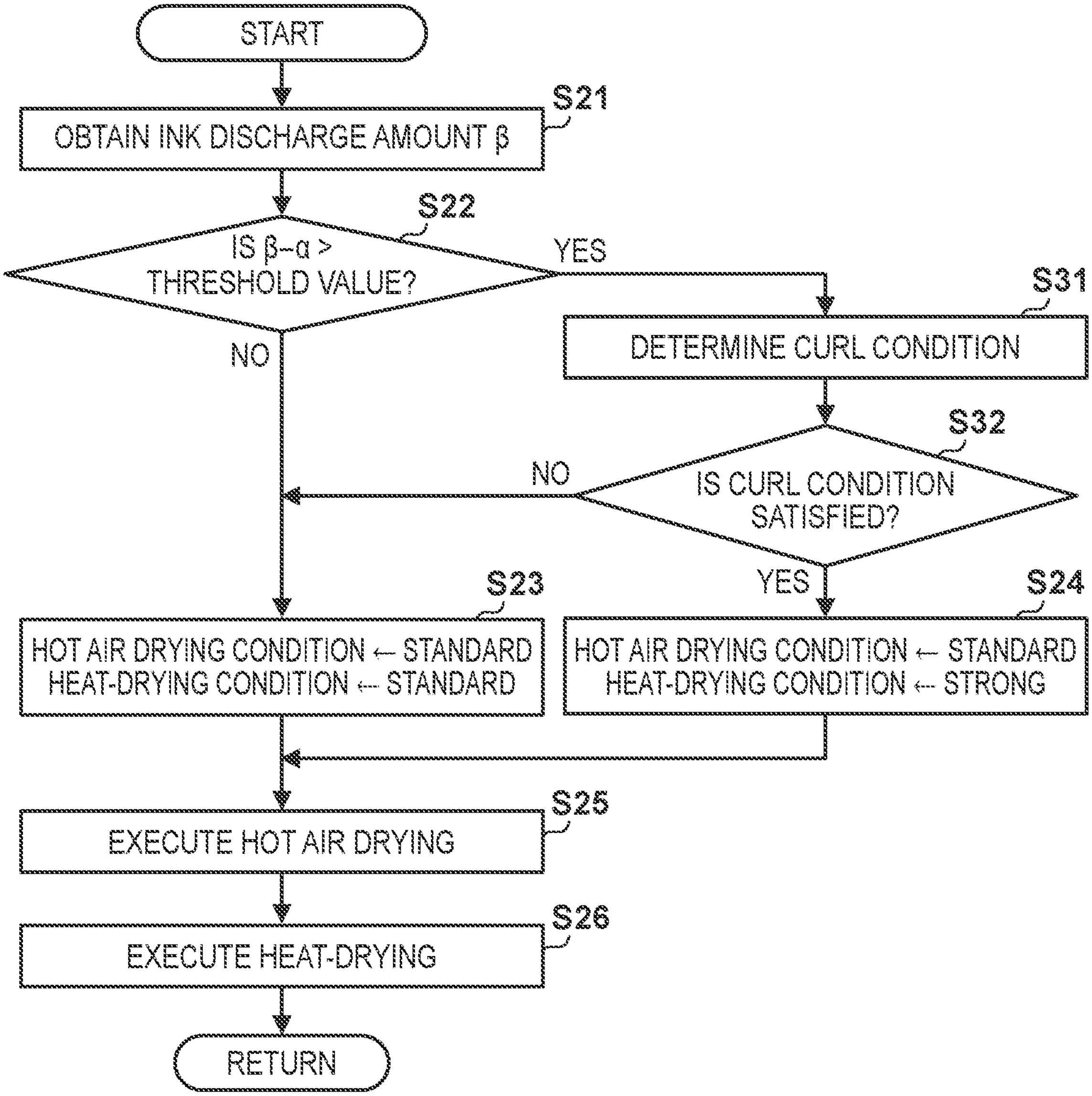
FIG. 12A is a flowchart illustrating an example of other processing by the control unit.

The curl of the sheet P, generally, tends to occur locally at a peripheral edge portion of the sheet P. Accordingly, the processing of step S24 of the first embodiment may be performed only in the case where there is a high probability that a curl will occur locally in the sheet P. FIG. 12A illustrates an example of the processing of step S2 of FIG. 11A in the present embodiment, and is another example of the processing example in FIG. 11C. Below, description will be given for an example of processing of FIG. 12A only for the processing different from the example of the processing of FIG. 11C.

Figure 12B:
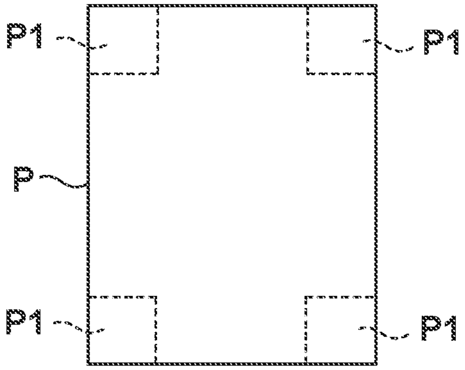
FIG. 12B is an explanatory view illustrating an example of an area of a sheet.

In the present embodiment, in step S22, in the case where the difference (β−α) between the amount of ink discharged α and the amount of ink discharged β is determined to have exceeded the threshold value, it is determined to be the curl condition in step S31. The curl condition is a condition for determining whether a curl will be produced locally in the sheet P, and in the present embodiment, it is determined by the amount of ink discharged to the front/back sides in a predetermined area of the sheet P. FIG. 12B illustrates an example of areas that are the target of the determination. Many cases where a curl will be produced due to the difference in the moisture content of the front/back sides of the sheet P are at the peripheral edge portion of the sheet P. In the example of FIG. 12B, the regions P1 of the four corners of the sheet P are made to be the target of the determination.

In step S31, in each of the four regions P1, the amount of ink discharged to the front side and the amount of ink discharged to the back side of that region are compared. In the case where the difference between the two at any one of the regions P1 is greater than or equal to a preset threshold value, it is determined that the curl condition is satisfied (a curl may occur).

In step S32, by the determination of step S31, if the curl condition is satisfied, the processing advances to step S24, and if the curl condition is not satisfied, the processing, advances to step S23. The other processing is the same as in the processing example of FIG. 11C.

By virtue of the present embodiment, in the case where it is estimated that a curl will occur locally, control (step S24) for reducing the difference in the moisture content between the front/back sides of the sheet P is executed, and therefore it will be possible to prevent an unnecessary change in drying control.

Third Embodiment

As described above, in the example of the configuration of the printing apparatus 5 of the first embodiment, in the case of double-side printing, there is a tendency (the standard setting case) for the degree of drying of the front side to be higher due to the degree of hot air drying being higher when the difference in the degree of drying of each side is considered in total for the drying acceleration units 40 and 50. In the case where the moisture content of the ink is higher for the back side than the front side of the sheet P, the image originally scheduled to be printed on the front side and the image originally scheduled to be printed on the back side can be switched. By the switching, the moisture content of the front side of the sheet P becomes larger than the back side. However, since the drying capability is higher for the front side, it is possible to keep the difference in moisture content between the front/back sides within the predetermined range with the standard setting. Moreover, it is possible to reduce the chance (step S24) of the heat increasing, and it is possible to reduce the power consumption.

Figure 13:
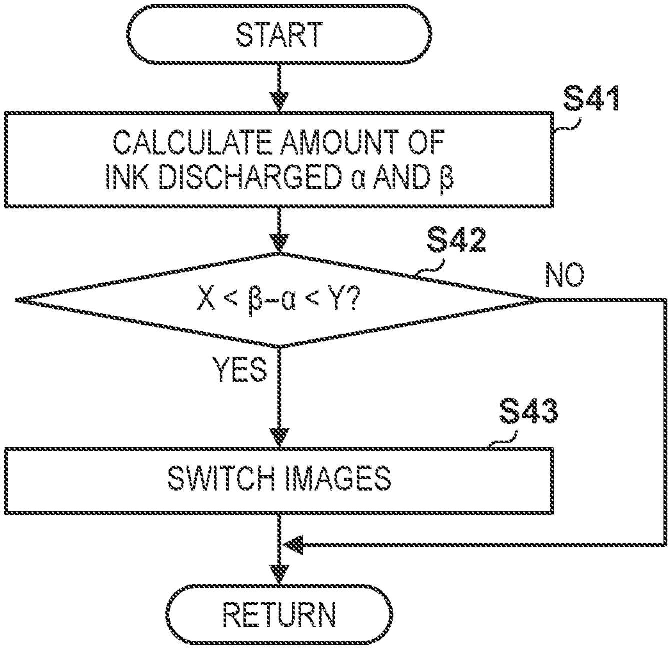
FIG. 13 is a flowchart illustrating an example of processing by the control unit.

FIG. 13 is a flowchart illustrating an example of processing for switching the printed images of the front/back sides of the sheet P. The switching processing of this figure is executed by the processing unit 10 or the image processing unit 14, for example, prior to starting printing on the sheet P. In the description below, the image originally scheduled to be printed on the front side of the sheet P is referred to as image A, and the image originally scheduled to be printed on the back side of the sheet P is referred to as image B.

In step S41, the ink discharge amount $\alpha$ of the image A scheduled to be printed on the front side of the sheet P and the ink discharge amount $\beta$ of the image B scheduled to be printed on the back side are calculated from the image data and the print data. The ink discharge amount $\alpha$ and the ink discharge amount $\beta$ calculated in step S41 are compared in step S42, and in the case where the relationship threshold value $X<\beta-\alpha\leq$threshold value Y is satisfied, the processing advances to step S43, and in the case where it is not satisfied, the processing is ended (the images are not switched). In step S43, the relationship between the images A and B with the front/back sides of the sheet P is switched. Specifically, the image B is set to be printed to the front side of the sheet P and the image A is set to be printed to the back side of the sheet P.

The threshold value X and threshold value Y are set based on the difference in the hot air drying capability with respect to the front side and the back side of the sheet P in the standard setting of the drying control. In detail, the threshold value X is a value by which, even with the standard setting, the difference in moisture content between the front/back sides can be kept within a predetermined range if the value $\beta-\alpha$ is less than or equal to the threshold value X. The threshold value Y is a value by which, if control to increase the heating by the drying acceleration unit 50 is not performed, the difference in moisture content between the front/back sides cannot be kept within the predetermined range when the value $\beta-\alpha$ exceeds the threshold value Y.

By the processing of FIG. 13, even in the case where the images on the front/back sides are switched, it is possible to apply processing of FIG. 11A to FIG. 11C of the first embodiment and the processing of FIG. 12A of the second embodiment. In this case, the ink discharge amount $\alpha$ is an amount of ink discharged to print the image B to the front side of the sheet P, and the ink discharge amount $\beta$ is an amount of ink discharged to print the image A to the back side of the sheet P. Then, as the threshold value for the processing of step S22, the threshold value Y of the step S42 of FIG. 13 may be applied.

In the present embodiment, in the case of double-side printing, in the case where the difference in moisture content between the front/back sides after printing is expected to slightly exceed the predetermined range, it is possible to keep the difference in moisture content within the predetermined range in correspondence with switching the images in step S43. In such a case, it is not necessary to change the setting for heat-drying control. Also, in a case where the difference in moisture content between the front/back sides after printing is expected to greatly exceed the predetermined range, it is possible to keep the difference in moisture content within the predetermined range in correspondence with changing the setting for the heat-drying control of the step S24.

Note that in the present embodiment, an example that combines the processing for switching the images illustrated in FIG. 13 and the change (step S24) of setting for heat-drying control illustrated in FIG. 11C and FIG. 12A was given. However, as a variation, configuration may be taken to perform processing for not performing the change of setting for heat-drying control (to leave the standard setting as is) and to reduce the difference in moisture content between the front/back sides of the sheet P by the processing of switching the images illustrated in FIG. 13 only. In such a case, the processing of step S42 may determine only whether the value of $\beta-\alpha$ exceeds the threshold value X. According to this variation, while there are cases where it is not possible to reduce the curl of the sheet P in the case where the difference in moisture content of the sheet P is large, it is possible to reduce the curl of the sheet P in the case where the difference of the moisture content is small. Also, since the setting for the hot air/heat-drying control need not be changed, it is possible to achieve a simplification in the processing and a reduction in power consumption that accompanies an increase in heating.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-154054, filed Aug. 26, 2019, which is hereby incorporated by reference herein in its entirety.

What is claimed is:

1. A printing apparatus, comprising:

a discharge head configured to discharge ink onto a printing medium conveyed by a conveyance unit configured to convey the printing medium;

a first heating unit configured to heat the printing medium onto which ink is discharged by the discharge head;

a second heating unit arranged on a downstream side of the first heating unit in a conveyance direction of the conveyance unit, and configured to heat the printing medium; and a control unit configured to control an amount of heat from the first heating unit or the second heating unit applied to the printing medium so as to change the amount of heat based on an amount of ink discharged onto the printing medium, wherein in a case of double-sided printing in which both sides of the printing medium are printed, the printing medium is conveyed by the conveyance unit so that each side of the printing medium is heated by the first heating unit and one side of the printing medium is heated by the second heating unit.

2. The printing apparatus according to claim 1, wherein the first heating unit includes air outlets, and is configured to heat the printing medium by blowing hot air through the air outlets.

3. The printing apparatus according to claim 1, wherein the control unit is configured to calculate the amount of ink based on image data.

4. The printing apparatus according to claim 1, wherein the control unit is configured to calculate the amount of ink by counting a number of ink discharges by the discharge head.

5. The printing apparatus according to claim 1, wherein the control unit is configured to control the output of the first heating unit or the second heating unit based on the amount of ink and a type of the printing medium.

6. The printing apparatus according to claim 1, wherein the second heating unit includes a heating element, and the control unit is configured to control the output of the second heating unit by changing a heat generation amount of the heating element.

7. The printing apparatus according to claim 1, wherein the first heating unit includes a fan, and the control unit is configured to change the output of the first heating unit by changing a drive amount of the fan.

8. A printing method, comprising:

discharging ink onto a printing medium conveyed by a conveyance unit configured to convey the printing medium; and controlling an amount of heat applied to the printing medium so as to change the amount of heat from a first heating unit or a second heating unit based on an amount of ink discharged onto the printing medium, the first heating unit being configured to heat the printing medium onto which ink is discharged in the discharging, and the second heating unit being arranged on a downstream side of the first heating unit in a conveyance direction of the conveyance unit, and configured to heat the printing medium, where in a case of double-sided printing in which both sides of the printing medium are printed, the printing medium is conveyed by the conveyance unit so that each side of the printing medium is heated by the first heating unit and one side of the printing medium is heated by the second heating unit.

9. The printing method according to claim 8, wherein the first heating unit includes air outlets, and is configured to heat the printing medium by blowing hot air through the air outlets.

10. The printing method according to claim 8, wherein in the controlling, the amount of ink is calculated based on image data.

11. The printing method according to claim 8, wherein in the controlling, the amount of ink is calculated by counting a number of ink discharges in the discharging.

12. The printing method according to claim 8, wherein in the controlling, the output of the first heating unit or the second heating unit is controlled based on the amount of ink and a type of the printing medium.

13. The printing method according to claim 8, wherein the second heating unit includes a heating element, and in the controlling, output of the second heating unit is controlled by changing a heat generation amount of the heating element.

14. The printing method according to claim 8, wherein the first heating unit includes a fan, and in the controlling, output of the first heating unit is changed by changing a drive amount of the fan.

* * * * *